United States Patent [19]

Teich et al.

[11] Patent Number: 5,625,980

[45] Date of Patent: May 6, 1997

[54] GARAGE DOOR OPENER WITH REMOTE SAFETY SENSORS

[75] Inventors: Oren Teich, South Orange; Vijay Tandon, Clifton; Rudor Teich, South Orange; Ralph Giffone, Bloomfield, all of N.J.

[73] Assignee: RMT Associates, South Orange, N.J.

[21] Appl. No.: 280,718

[22] Filed: Jul. 26, 1994

Related U.S. Application Data

[63] Continuation-in-part of Ser. No. 122,236, Sep. 15, 1993, Pat. No. 5,493,812.

[51] Int. Cl.⁶ .................................................. E05F 15/02
[52] U.S. Cl. ........................................... 49/26; 49/25
[58] Field of Search .................................... 49/25, 26, 27, 49/28; 160/1, 133, 188, 310, 312; 200/61.43

[56] References Cited

U.S. PATENT DOCUMENTS

| | | | |
|---|---|---|---|
| 2,755,081 | 7/1956 | Johnson et al. | 160/188 |
| 2,789,636 | 4/1957 | Lawick | 160/188 |
| 2,909,718 | 10/1959 | Lawick | 160/188 X |
| 3,001,038 | 9/1961 | Gessell | 49/28 |
| 3,967,258 | 6/1976 | Bucy, Jr. | 340/258 |
| 4,092,643 | 5/1978 | Stolarczyk | 340/416 |
| 4,102,382 | 7/1978 | Vesbach | 160/188 |
| 4,247,806 | 1/1981 | Mercier | 318/267 |
| 4,274,226 | 6/1981 | Evans | 49/25 |
| 4,289,995 | 9/1981 | Sorber et al. | 49/28 |
| 4,561,691 | 12/1985 | Kawai et al. | 49/28 |
| 4,621,223 | 11/1986 | Murakami et al. | 49/28 |
| 4,701,684 | 10/1987 | Seidel et al. | 49/28 |
| 4,922,168 | 5/1990 | Waggamon et al. | 318/286 |
| 4,924,206 | 5/1990 | Ayers | 340/426 |
| 4,953,608 | 9/1990 | Larsson | 49/28 |
| 4,972,629 | 11/1990 | Merendino et al. | 49/25 |
| 4,981,084 | 1/1991 | Templeton et al. | 49/28 |
| 5,040,331 | 8/1991 | Merendino et al. | 49/25 |
| 5,069,000 | 12/1991 | Zuckerman | 49/28 |
| 5,115,236 | 5/1992 | Köhler | 340/825.69 |
| 5,127,190 | 7/1992 | Hein et al. | 49/28 |
| 5,142,822 | 9/1992 | Beckerman | 49/28 |
| 5,191,268 | 3/1993 | Duhame | 318/266 |
| 5,243,784 | 9/1993 | Whitaker et al. | 49/28 |

*Primary Examiner*—Kenneth J. Dorner
*Assistant Examiner*—Jerry Redman
*Attorney, Agent, or Firm*—Gottlieb, Rackman & Reisman, P.C.

[57] ABSTRACT

An automatic door opening safety system particularly for use with garage doors is provided. The garage door includes a leading edge that moves from the open position, where the leading edge defines the top of the opening and a closed position, where the leading edge contacts the ground. A controller is provided for controlling movement of the door. An activation member provides an input to the controller to initiate movement of the door. A non-contact detector detects whether an obstruction is in the path of the door. The non-contact detector is positioned in front of the leading edge of the door, such that obstructions are detected at a predetermined distance in front of the leading edge of said door.

20 Claims, 6 Drawing Sheets

GARAGE DOOR OPENER WITH REMOTE SAFETY SENSORS

CROSS-REFERENCE TO RELATED APPLICATIONS

This application is a continuation-in-part of U.S. patent application Ser. No. 08/122,236, filed on Sep. 15, 1993, now U.S. Pat. No. 5,493,812.

BACKGROUND OF THE INVENTION

This invention is generally directed to a garage door opener and, in particular, to a garage door opener having a remote safety sensor that is mounted to the lower portion of the garage door and is adapted to extend a predetermined distance below the lower edge of the garage door, and move with the garage door.

Electronic garage door openers have taken many forms in the prior art. As these electronic garage door openers have become more common and there have been more instances of injury, rules with regard thereto have been proliferated by local, state and federal lawmakers. Effective as of Jan. 1, 1993 a rule was placed into effect that all electronic garage doors installed must be equipped with a safety device that will reverse a closing door if an obstruction is present in the last six inches of the door's travel (six inches above ground level).

Garage door safety features have taken many forms since they were first developed. For example, one of the early features developed in the garage door industry was to include a type of pressure sensing device, such that, if the garage door were in the closing process, and a pressure was exerted in a direction opposite to closing, the garage door would reverse direction (open). This device was not entirely adequate because once a force was exerted in the opposite direction, a sufficient pressure may have already been exerted against the object to cause damage. For example, if a small child were in the path of the garage door, the child could be knocked down and injured prior to the garage door reversing direction.

A second type of safety system as shown in U.S. Pat. No. 4,922,168 (Waggamon et al.) includes infrared transmitters and receivers hard wired to the motor so that if an obstacle is located between the transmitter and receiver, which necessarily means in the path of the garage door, the receiver would send a signal to a motor controller to reverse direction of the garage door. This device is sufficient for its provided purpose. However, it can be quite costly and time consuming to hardwire a transmitter and receiver device to a motor controller which is located away from the transmitter and receiver. For instance, the transmitter and receiver may be located at the bottom of the tracks near the ground, while the motor controller and motor are mounted at the opposite end of the track. This placement is necessitated by the purpose of each element; the detector must sense for obstructions near the ground and the motor must provide the appropriate lifting force to lift the garage door.

Not only is the cost of wiring the device time consuming and expensive, there is the additional problem that garage doors are essentially outdoor products that require high quality and costly electrical connectors due to their exposure to the elements (rain, snow, cold weather, warm weather and general dampness) associated with a garage. Furthermore, since this is a safety feature, long term reliability is a requirement. Accordingly, a commercialized product must be designed so that it is not vulnerable to moisture and the connections between the sensors and the motor controller require costly design and installation in order to meet industry water-soak and pressure requirements. Eliminating wiring altogether would thus provide significant economical advantages.

Wireless communication systems are not new; for example, a wireless system for detecting intrusions is shown in U.S. Pat. No. 3,967,258 (Buck, Jr.). This system utilizes battery operated sensors that also incorporate a low battery sensor. This inclusion of the low battery sensor uses slightly more battery power than if the low battery sensor were not present. Accordingly, this does not help in providing increased battery life as is one of the goals of the present invention.

Accordingly, the present invention contemplates a wireless system that eliminates many of the problems associated with designing and installing hardwired garage door safety systems. However, the main problem with a wireless system (battery operated) is that wireless receivers use a substantial amount of energy. The battery life of such devices is relatively short if they are maintained in a continuously active state. To the extent that low-current receivers are available, they tend to be expensive and uneconomical for this application. Accordingly, the present invention overcomes the deficiencies in prior art hardwired systems and overcomes the problems associated with a wireless system, namely limited battery life. This is accomplished by providing a low cost wireless remote system that includes a dormant state and an active state in order to minimize power consumption and maximize battery life.

A further problem with prior art hardwired systems is that the obstruction detection sensors are mounted to the track in a stationary fashion; for example, six inches above ground level. In this way only an obstruction at the noted height will be detected. Accordingly, an automobile that is positioned such that the trunk extends into the path of the garage door would not be detected if the tires of the automobile did not cross the detection sensor.

A first step in solving the above noted deficiency was set forth in prior art U.S. Pat. No. 5,191,268 (the '268 patent) issued Mar. 2, 1993. The '268 patent describes a continuously monitored supplemental obstruction detector for a garage door operator. The obstruction detector is a compressible detector or safety edge that is located on the leading edge of the garage door. The detector functions by sending a safety signal to the controller when the door is moving unobstructed. Alternatively, if the leading edge of the door contacts an object, the detector sends a signal to the controller to stop moving the door. However, the damage may have already been done because the door has contacted the object by the time the stop signal is transmitted to the controller.

The prior art garage door safety systems all suffer from similar shortcomings which stem from the fact that the detectors must all be hard wired to the controller assembly. The parent application to this application helped solve the problems associated therewith. The present invention goes further and provides a non-contact moving safety sensor capable of extending a predetermined distance below the leading edge of the garage door, so that the detector senses an obstruction in the path of the garage door prior to impact. Furthermore, the present invention also provides a reliable method for linking a contacting safety sensor to the garage door controller.

SUMMARY OF THE INVENTION

Generally speaking, in accordance with the instant invention, a wireless garage door safety system is adapted for use with an independent energy source (battery). A control circuit is provided for controlling the movement of the garage door. A touch pad or remote control switch is provided for activating the control circuit to start the garage door moving. A non-contact detecting member, normally an infrared transmitter and receiver combination, is provided for detecting whether an obstruction is located in the path of the garage door. The non-contact detecting member is positioned in front of the leading edge of the garage door. In particular, the non-contact detecting member is coupled proximate the leading edge of the garage door and extends into the space a predetermined distance below the leading edge of the garage door.

The detection member is designed to be switchable between a first state, wherein the detection member does not detect obstructions and consumes minimal energy, and a second state, wherein the detection member detects obstructions. In other words, a dormant state, using minimal energy and an active state. The detection member is selectively switchable from the dormant state to the active state by the control circuit.

In the preferred embodiment of the invention, a pair of first mounting plates are mounted to the garage door facing the inside of the garage. Each first mounting plate has two hinged arms coupled thereto holding a second swing plate. Thus, each first plate, second swing plate and pair of hinged arms forms a parallelogram. Thus, the swing plate moves in a plane parallel to the mounting plate and the garage door. An infrared transmitter is mounted to one swing plate by a ball joint arrangement, and an infrared receiver is mounted to the second swing plate by a second ball joint, such that the infrared transmitter and receiver are aligned.

One embodiment of the wireless safety system includes a detection member that includes a vibration sensor that senses motion of the garage door on the track system in order to wake up the detection member. An audio frequency transducer is used to translate the vibration of the track into an electric signal to wake up the detection member from the dormant state. The audio frequency transducer may be of the piezoelectric type. Once the detection member is in the active state, it wirelessly transmits a signal to the control circuit to indicate when no obstruction is located between the two ends being sensed.

A method of operating a wireless garage door opening system in order to reduce depletion of an external energy source that includes means of detecting obstructions in the path of the garage door is also provided. The system includes a control circuit, a motor and a detection member that is switchable between a first state and a second state as noted above with regard to the system. The method includes a first step of activating the control circuit and a second step of transmitting a wake up signal from the control circuit to the detection member. The detection member is then switched from the first state to the second state. This enables the detection member to sense when an obstruction is in the path of the garage door. A control signal is then transmitted from the detection member to the control circuit at predetermined intervals when no obstruction is detected. If an obstruction is detected, no control signal is transmitted to the control circuit; the garage door then ceases to close.

Accordingly, it is an object of the invention to provide a wireless safety system for a garage door that is mounted such that it detects obstructions a predetermined distance below the leading edge of the garage door, such that the obstruction is detected prior to the door making physical contact with the obstruction.

A further object of the invention is to provide a safety system for a garage door opener that includes an obstruction detector that is easy to install.

A still further object of the invention is to provide a safety system for a garage door opener that retracts as the door closes in on the floor.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
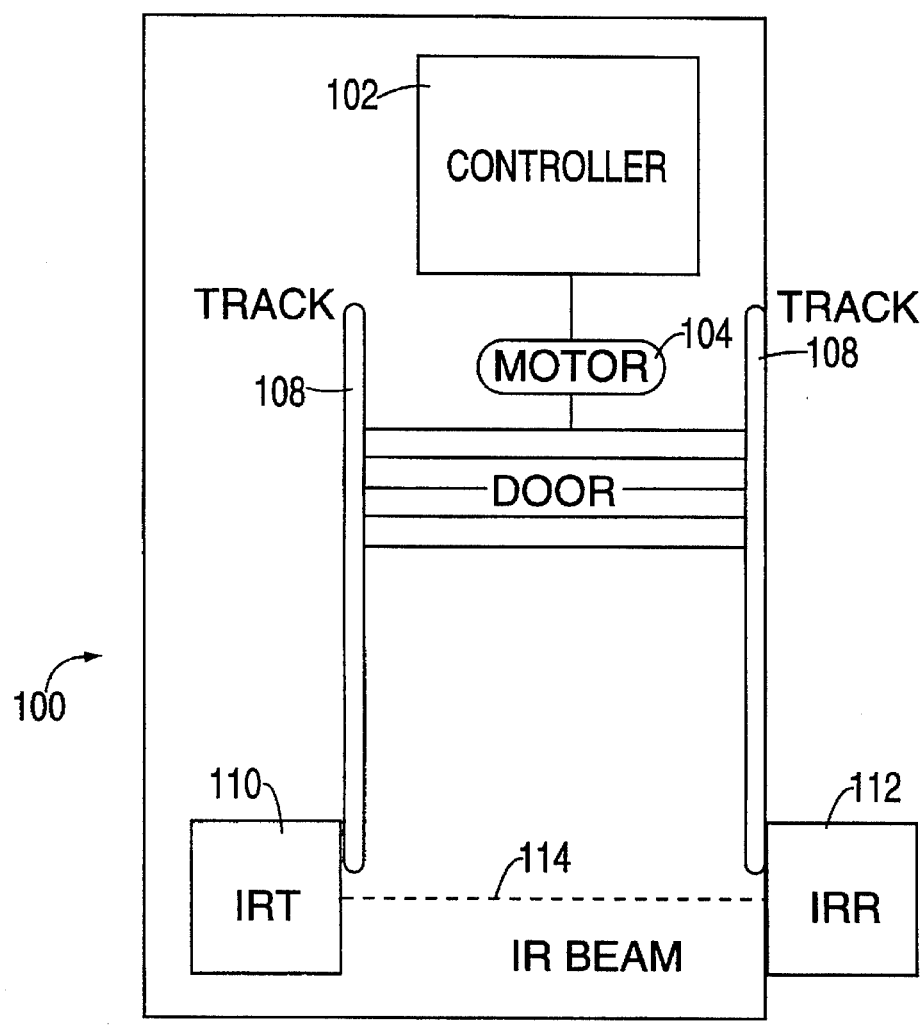
FIG. 1 is a diagrammatic system overview showing the system components in block form.

Reference is now made to the figures, wherein FIG. 1 is a schematic representation of the wireless safety system for a garage door opener, which is generally indicated at 100. The safety system includes a controller 102, a motor 104, a garage door 106 slidable on tracks 108, an infrared transmitter 110 and an infrared receiver 112.

Controller 102 is the command center of the wireless safety system for the garage door opener. Controller 102 is electrically coupled to motor 104 and motor 104 is coupled to garage door 106. Garage door 106 is slidable along tracks 108 and displaceable between an up position and a down position. Infrared transmitter 110 and infrared receiver 112 are in communication via infrared beam 114. The infrared transmitter and infrared receiver are remote from controller 102; however, infrared receiver includes a wireless radio signal transmitter to transmit information to controller 102. The operation of infrared transmitter 110 and infrared receiver 112 will be discussed in more detail below.

Controller 102 generally provides an electronic input to motor 104 which causes motor 104 to physically raise and lower door 106 along tracks 108. Infrared transmitter 110 transmits an infrared beam 114 that is received by infrared receiver 112. Under normal operation, upon receipt of infrared beam 114 by infrared receiver 112, infrared receiver 112 outputs a radio frequency signal to controller 102 to continue moving garage door 106. When the safety beam is interrupted, the transmitter within infrared receiver 112 does not output a radio frequency signal to be received by controller 102. Accordingly, controller 102 causes motor 104 to either stop or reverse direction (open).

Figure 2:
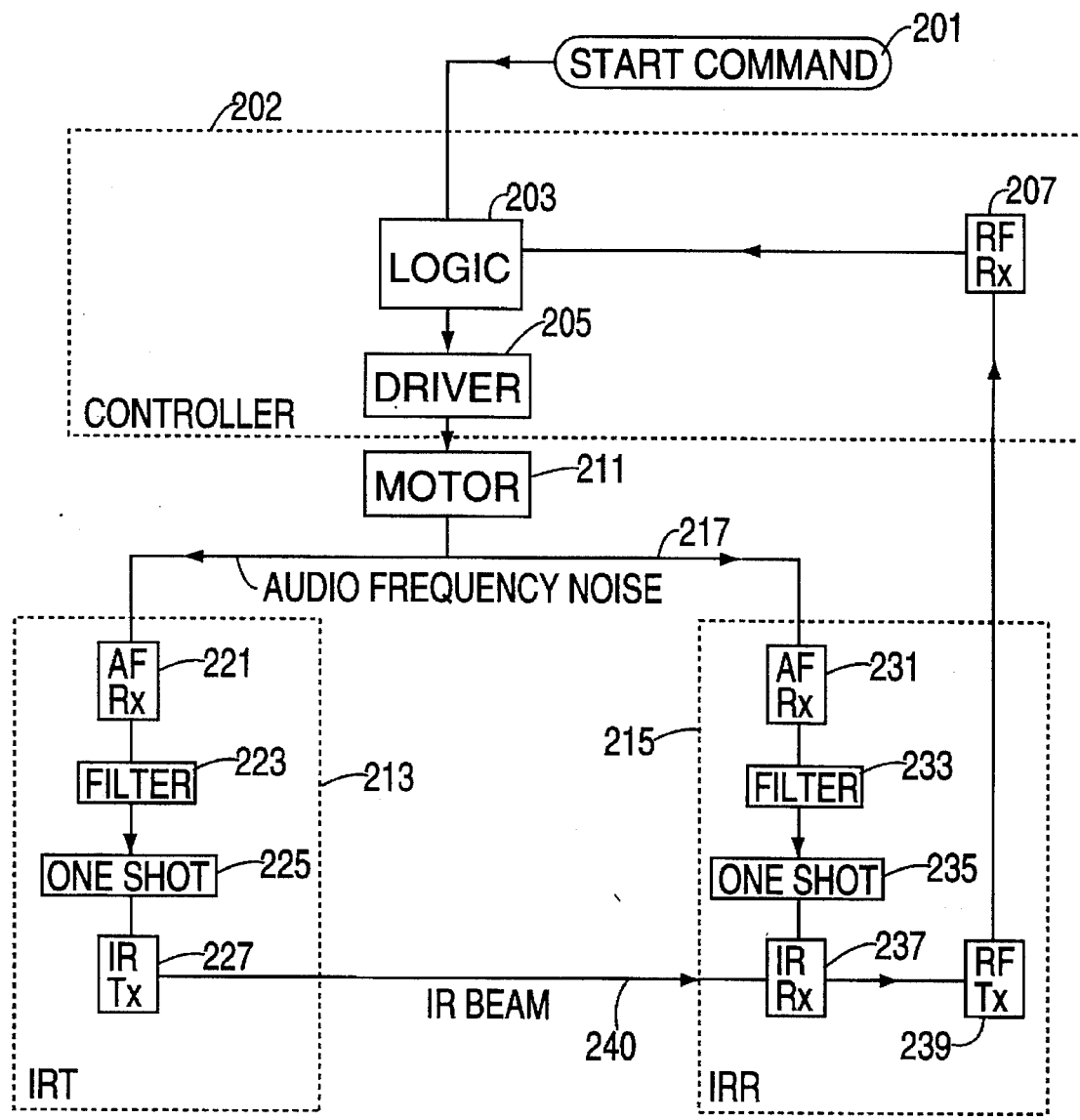
FIG. 2 is a block diagram of the system componentry in accordance with the invention.

With particular reference to FIG. 2, a block diagram of the present invention is depicted. A start command 201 is given by an operator via a manual switch or a remote control. This causes a signal to be input into controller unit 202. Controller 202 includes logic 203, driver 205 and RF receiver 207. Controller 202 is electrically connected to motor 211 which is connected to an infrared transmitter assembly 213 and infrared receiver assembly 215 via audio frequency noise 217.

The infrared transmitter assembly 213 is formed of an audio frequency receiver 221, a filter 223, a monostable multivibrator (one shot) 225 and an infrared transmitter 227. The infrared receiver assembly 215 is formed of an audio frequency receiver 231, a filter 233, monostable multivibrator (one shot) 235, an infrared receiver 237 and a radio frequency transmitter 239.

The start command transmits a pulse to logic block 203. Upon receipt of the first pulse, logic block 203 transmits an ON signal to driver 205. This causes driver 205 output an appropriate driving current to cause motor 211 to function. As stated above when the motor is operating, it causes door 106 to slide along tracks 108 of FIG. 1. When door 106 slides along tracks 108 an audio frequency noise 217 is created.

Audio frequency receivers 221 and 231 receive audio frequency noise 217 when garage door 106 slides along tracks 108. The audio frequency receivers 221 and 223 are in essence audio frequency transducers that receive audio frequency noise and convert same into electric potential. A voltage or electric potential is output from audio frequency receivers 221, 231 and is input into filters 223, 233. The filters 223, 233 essentially integrate the energy in a predetermined bandwidth and generate an output—assuming the energy input exceeds a preset threshold. The output from filters 223, 233 is input to one shot 225, 235. The one shot is essentially a monostable multivibrator which provides an electric potential for driving the infrared transmitter 227 and infrared receiver 237 for a fixed amount of time. In other words, the one shot may be turned on for a preset period of time, for example 0.1 seconds.

Accordingly, the infrared transmitter 227 and infrared receiver 237 are powered for 0.1 seconds each time the one shot 225, 235 is activated. This causes infrared transmitter 227 to transmit infrared beam 240 that is received by infrared receiver 237. As long as infrared receiver assembly 215 receives audio frequency noise 217 at audio frequency receiver 231 to activate the unit, and receives infrared beam 240 at infrared receiver 237, the infrared receiver 237 will activate radio frequency transmitter 229 to transmit a predetermined radio frequency. Radio frequency receiver 207 of controller 202 receives the radio frequency transmission from radio frequency transmitter 239 of infrared receiver assembly 237. Upon receipt of the radio signal at radio frequency receiver 207, radio frequency receiver 207 transmits a logic pulse to logic 203. This in turn causes logic 203 to continue outputting a positive signal to driver 205, such that driver 205 continues to drive motor 211. Thus, door 106 continues to make noise on tracks 108 and infrared transmitter assembly 213 and infrared receiver assembly 215 continue to be driven. This cycle continues until logic 203 turns off the driver due to the door being completely open or closed, or an obstruction is detected by infrared beam 240.

Figure 3:
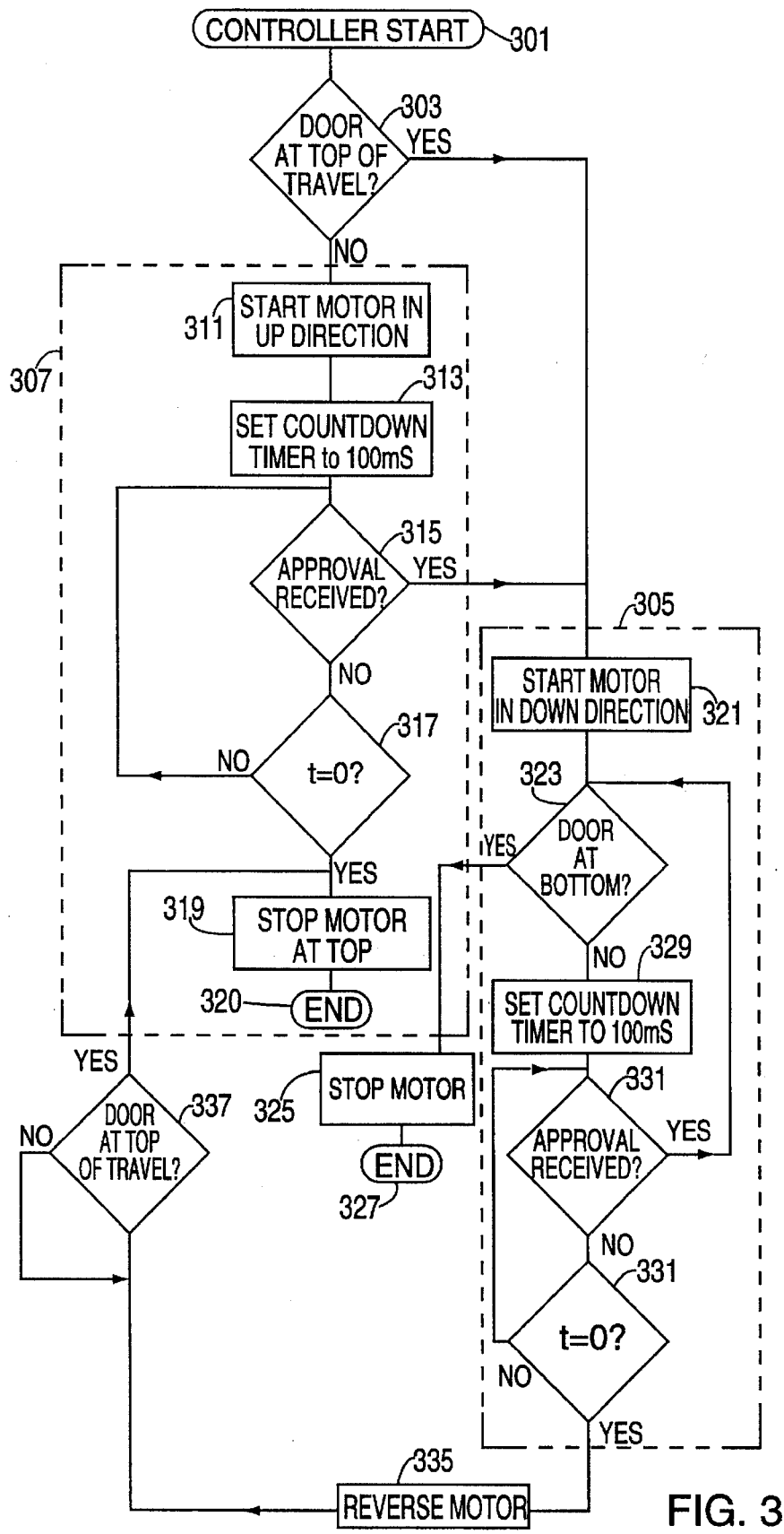
FIG. 3 is a flow diagram of the decision making process in accordance with an optional feature of the invention.

Reference is next directed to FIG. 3, which is a flow chart of one optional embodiment of the logic process of logic 203 of FIG. 2. In particular, this subroutine is for closing the garage door. As a safety feature, when the garage door is stopped at a position that is less than fully open, the garage door can be optionally designed to initially move up rather than down. The advantage to this feature is discussed immediately below.

The process begins at controller start block 301 which is an initialization or power up. It is determined whether the garage door 106 of FIG. 1 is at the top of its travel in step 303. If the door is at the top of its travel, the close door subroutine 305 is initiated. Alternatively, if the door is not at the top of its travel, the door will begin its initial motion in the up direction in accordance with open door subroutine 307. The initial motion in the up direction is prior to the infrared transmitter assembly 213 and infrared receiver assembly 215 being activated. It is desirable to have the safety sensors activated by the motion of the door in the opening direction because if the sensor is blocked the door should move in the down direction. Accordingly, if the door is less than fully open, it is desirable to have the door moving in the up direction when the sensor is not operating.

The open door subroutine 307 begins at logic step 311, with the motor being initiated in order to move the garage door in the up direction. Logic step 312 sets a countdown timer to 100 milliseconds and the counter begins counting down. Logic step 315 asks the question whether approval has been received. Referring back to FIG. 2, approval is received when radio frequency transmitter 239 transmits a radio signal that is received by radio frequency receiver 207 and radio frequency receiver 207 inputs a signal to logic 203. The signal transmitted to logic 203 is the approval signal. Referring back to FIG. 3, if no approval signal is received logic step 317 is performed and it is determined whether the time from the countdown timer in logic step 313 equals zero. If the time does not equal zero, then the logic returns to logic step 316 to determine whether the approval has been received. Alternatively, if the time equals zero then the motor is stopped at the top in logic step 319 and the program is terminated at logic step 320. In other words, door 106 of FIG. 1 moves upward along tracks 108 of FIG. 1 until infrared transmitter assembly 213 and infrared receiver assembly 215 wake up and transmit approval, or in the alternative if no approval is received within 100 milliseconds the program is terminated.

If the door is at the top of travel at step 303, or if approval is received in step 315 then close door subroutine 305 is initiated. An input pulse indicating to start the subroutine is input at logic block 321 which starts the motor in the down direction. The question is next asked whether the door is at the bottom of its swing in logic block 323. If the door is at the bottom of its swing, the motor is terminated in step 325 and the program ends in step 327. Alternatively, if the door is not at the bottom of its swing in logic step 323, a countdown timer is set to 100 milliseconds in logic step 329. In logic block 331 the question is asked whether approval has been received. This is the same approval noted above with regard to logic step 315. If approval has been received then the logic is returned to step 323 and continues back as described above. Alternatively, if approval has not been received, logic step 333 asks whether the time equals zero. This timer is the one set to 100 milliseconds in logic block 329. If time does not equal zero in step 333, the logic is returned to step 331 to check whether approval has been received again. This continues until time equals zero or approval is received. Accordingly, for the door 106 of FIG. 3 to move efficiently down tracks 108, approval should be received more often than once every 100 milliseconds. If this is accomplished, then the motor will continuously run until a yes answer is received in logic step 323 "door at bottom?". A yes answer causes the motor to stop automatically at logic step 325.

Alternatively, if logic step 333 receives a yes answer that the time equals zero and no approval was received in the last 100 milliseconds, then it is assumed that an obstruction exists between infrared transmitter assembly 213 and infrared receiver assembly 215 of FIG. 2. Accordingly, the motor would be reversed in step 335 and logic step 337 asks whether the door is at the top of travel. If the door is not at the top of the travel a continuous loop is started by 337 that will continue to loop until a yes answer is received. Once the door is at the top of the travel, a yes response is given in step 337, and the motor is stopped at the top of the tracks in logic step 319, and the program is terminated at logic block 320.

Accordingly, it can be seen that FIG. 3 contemplates a logic block for initiating the controller unit, wherein the close door portion of the subroutine is entered. If an obstruction is detected between the infrared transmitter assembly 213 and the infrared receiver assembly 215, the door automatically stops moving in the down direction within 100 milliseconds. As stated above, the preferred embodiment contemplates stopping the door during the up routine in a position prior to being completely open, so that the answer in logic block 303 is no and the motor can start in the up direction in logic block 311. In this way, the infrared transmitter assembly 213 and infrared receiver assembly 215 of FIG. 2 can be activated by audio frequency noise 217 of the door 106 moving along tracks 108 of FIG. 1. Once approval is received in logic block 315 of FIG. 3, the motor can be initiated to the down direction in logic block 321 in order to start the close door subroutine 305. Thus, there is no danger in the door moving in the down direction for any period when the infrared transmitter and receiver assemblies 213, 215 are in the dormant state. However, using the preferred circuitry as described below, the infrared transmitter and receiver assemblies 213, 215, can be activated within less than one second, and can stop the garage door with almost no delay. Thus, while the "up before down" logic provides some advantage, it may not be necessary for the average home use.

The aforenoted detailed description of the preferred embodiment discloses one manner in which the system operates. An alternative embodiment could include an infrared transmitter that is converted to the active state from the dormant state by vibration (either of the track as described above, or by the door as described below). This would require a piezocircuit as described in more detail below. The infrared beam produced by the infrared transmitter would then activate the infrared receiver, when the light beam from the infrared transmitter hits the infrared receiver. This embodiment may be the most preferred embodiment because it reduces the expense by only using one piezocircuit.

In a second alternative embodiment, the infrared transmitter assembly 213 and infrared receiver assembly 215 can be activated by radio frequency receivers that receive a radio frequency signal from controller 202. In this way, the audio frequency noise would not be sensed and alternatively, the infrared transmitter assembly 213 and infrared receiver assembly 215 would include radio frequency receivers instead of audio frequency receivers. This is one alternative embodiment for accomplishing the same result of providing an infrared transmitter assembly and infrared receiver assembly that can wirelessly be coupled to the controller unit.

A third alternative embodiment could include sending an infrared signal to wake up the detection elements. This would simply include having an infrared receiver located in both detection elements.

DOOR MOUNTED SAFETY BEAM

Figure 4:
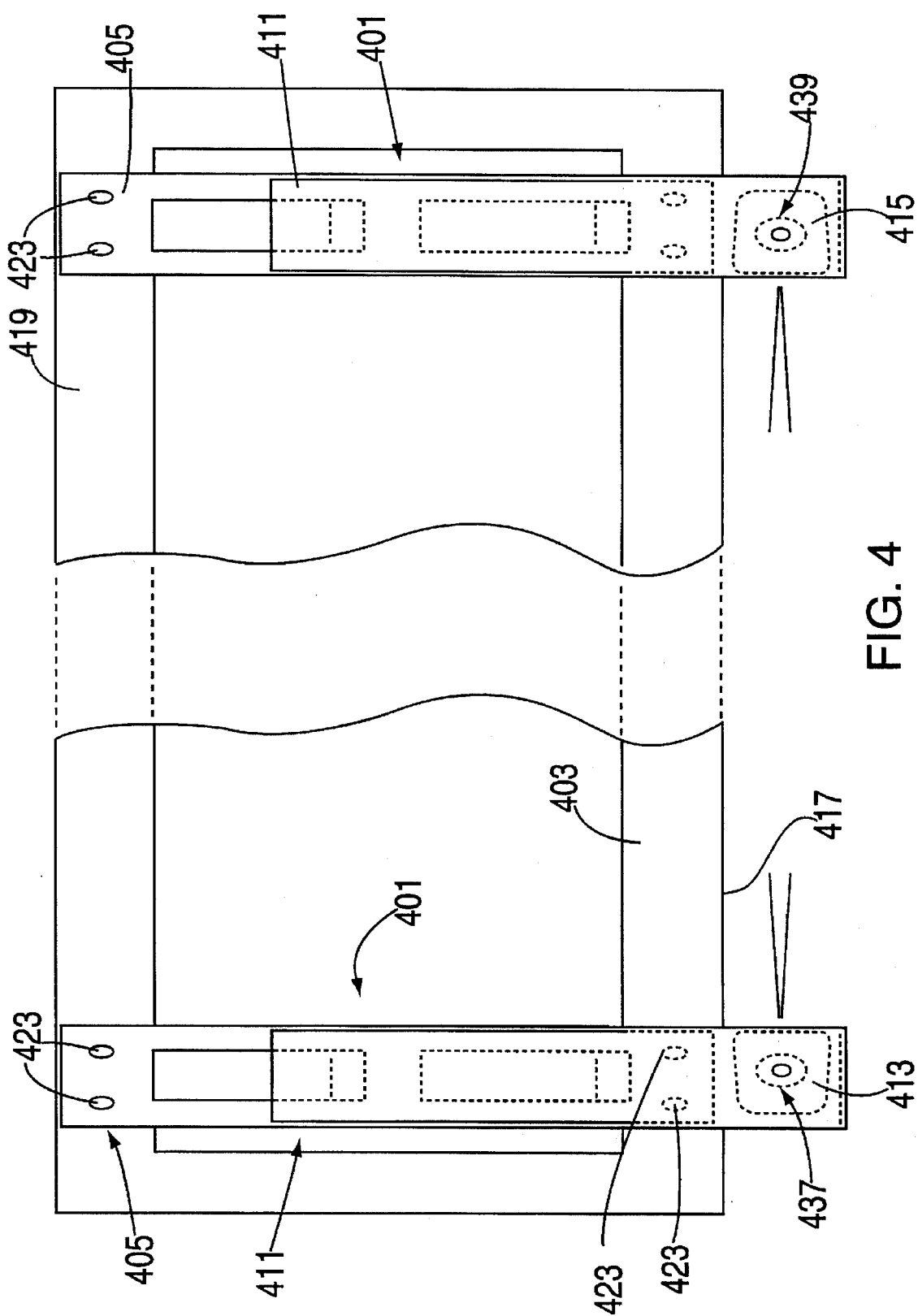
FIG. 4 is a plan view of the bottom section of a garage door with infrared transmitter and receiver coupled thereto in accordance with one embodiment of the invention.
Figure 5:
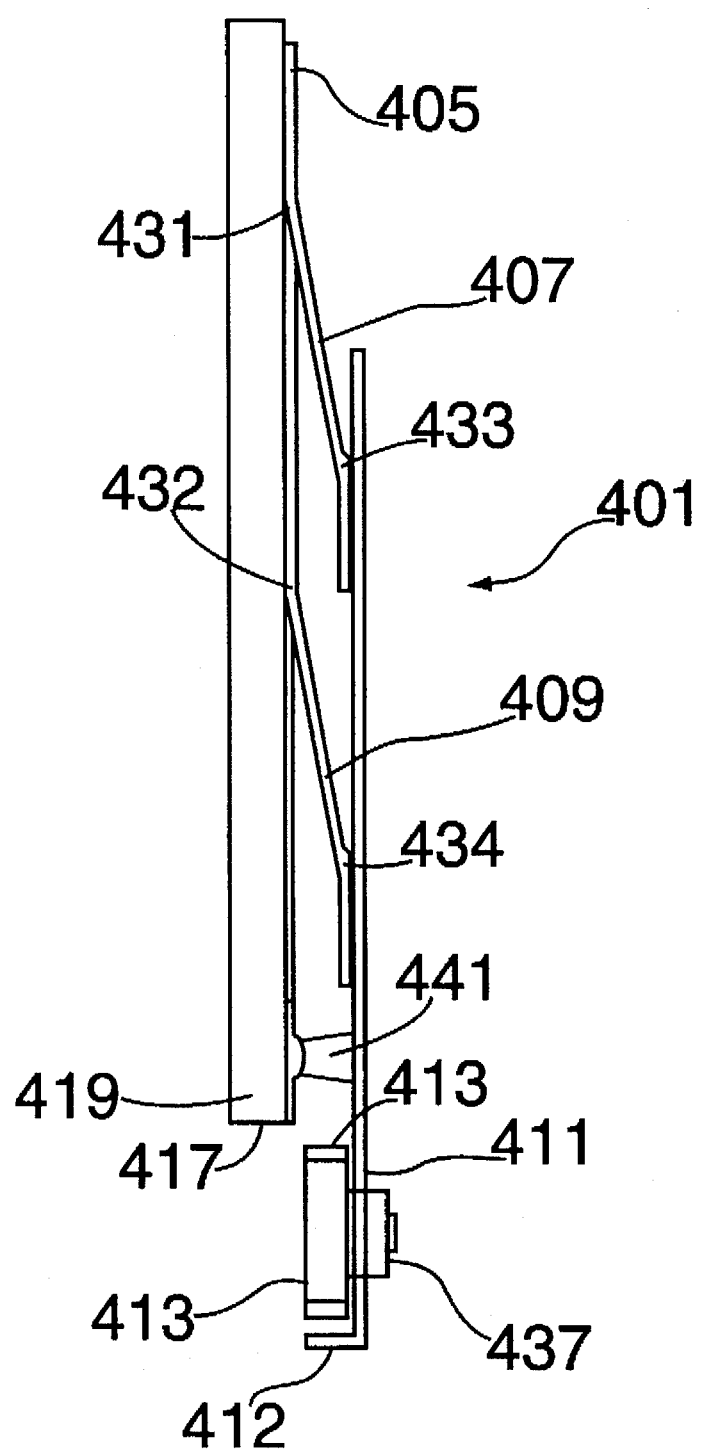
FIG. 5 is an elevational view of an infrared transmitter mounted to the lower section of a garage door—the infrared/receiver is mounted similarly thereto.

With the invention of wireless safety beams as described above, it is possible to configure the safety system (infrared transmitter and receiver) such that it travels with the door. With particular reference to FIGS. 4 and 5, one embodiment of a door mounted obstruction sensor is disclosed. In this embodiment, there are two mounting assemblies, each is generally indicated at 401 and is coupled to garage door 403. Each mounting assembly 401 includes a base plate 405 arms 407, 409 and a second mounting plate 411 coupled thereto. An infrared transmitter 413 is coupled to one of the second base plates 411 and an infrared receiver 415 is coupled to the other of said second mounting plates 411.

Specifically, each base plate 405 is coupled to the bottom section of a garage door. Leading edge 417 of the garage door is the edge that contacts the ground when the garage door is in the closed position. Conventional garage doors for home use are constructed with solid frames 419, and thin decorative sheets 421 inside the frame 419. The base plate 405 is preferably coupled to the frame 419 by a plurality of screws 423.

In the preferred embodiment, base plate 405 is formed of molded plastic, and the molded plastic is formed to fit the largest frames commonly found in the garage door industry. In this way, base plate 405 can be cut down in size to also accommodate smaller frames. In an alternative embodiment, the base plate 405 can be molded in various sizes to fit various sized frames.

Base plate 405 is integrally formed with arms 407, 409 attached thereto, and arms 407, 409 are integrally formed with second mounting plate 411. In the preferred embodiment, "living hinges" 431, 432, 433 and 434 are formed at the intersection of each arm 407, 409 with base plate 405 and mounting plate 411. Infrared transmitter 413 and infrared receiver 415 are mounted in alignment on respective mounting plates 411 at a position proximate the bottom edge of mounting plate 411. Mounting plate 411 is formed with a curved bottom wall to protect transmitter 413 and receiver 415.

Transmitter 413 and receiver 415 are mounted on mounting plates 411 by ball joints 437, 439 this allows the technician assembling the safety system to align transmitter 413 and receiver 415.

Each mounting assembly 401 is designed to be formed as a parallelogram, such that mounting plate 411 is maintained in parallel with base plate 405 and arm 407 is parallel to arm 409. Mounting plate 411 is further formed with a curved bottom wall 412 that substantially surrounds the bottom surface of transmitter 413 or receiver 415. A standoff 441 is molded into mounting plate 411 in order to prevent the "parallelogram" shape from collapsing when transmitter 413 and receiver 415 are hanging freely below leading edge 417. This is to provide extra support for arms 407, 409 and living hinges 431–434.

During operation, transmitter 413 and receiver 415 are suspended below leading edge 417 while the door is in the open position. The transmitter 413 and receiver 415 function as described above with regard to the safety signal, impulses and transmission back to the control assembly. As the garage door comes to a closed position, the bottom wall 412 of mounting plate 411 will contact the ground and will be forced in the direction of arrow A due to the downward pressure of the door moving, upward pressure of the ground and accordingly arms 407, 409 pivot at living hinges 431–434 and force mounting plate 411 in the direction of arrow A.

An alternative system for extending the infrared transmitter and receiver below the leading edge of the door could use a cylinder mounted to the garage door, and a plunger located therein. The transmitter would be coupled to the plunger and protected from shock by a housing. When the housing hits the ground during the downstroke of the door, the plunger extends into the cylinder. Thus, the transmitter is not damaged.

The transmitter and receiver are preferably located at opposite ends of the garage door, so that they detect all obstructions located in the path of the garage door. Furthermore, if an obstruction is located in the path of the obstruction detector itself, the detector will be deflected out of alignment and accordingly the obstruction detector will indicate the presence of an obstruction.

Whether the obstruction sensor is for a stationery sensor or a door-mounted obstruction sensor, the "waking up" of the obstruction sensor is similar. The same method can be used for both; however, more options are available when the obstruction sensor is mounted on the door. A door mounted obstruction sensor comprising infrared transmitter 413 and infrared receiver 415, can use the physical motion of the sensor, which is attached to the moving door. A motion or vibration sensor can provide reliable wake up at a lower cost. Common examples of motion sensors that are available at low cost are mercury switches and inertia vibration detectors.

WAKE UP CIRCUITRY

As described hereinabove, the object of the invention is to provide a wireless obstruction sensor. In so doing, batteries are used to operate the obstruction sensors. A goal of saving battery life is accordingly required. In order to save battery life the wake up system described above was developed. The preferred embodiment of the wake up circuitry is disclosed in FIG. 6.

Wake up circuitry, generally indicated at 600 includes a piezoamplifier circuit 601, and envelope detector with adaptive threshold 603 and an integration carrier detector 605.

Piezoamplifier 601 includes a piezoelectric sensor 607 that detects vibration and outputs a low-level signal in response to the vibrations. The piezoamplifier 601 is designed to receive the low-level signal output from piezoelectric transducer 607 and amplify the desired signal. Piezoamplifier 601 incorporates bipolar junction transistors 609 and 611 along with RC circuitry to form a low-power active filter with bandpass characteristics. In other words, the signal output from the piezoelectric element 607 is amplified in the specific frequency range desired, and is filtered in the undesired range.

Figure 6:
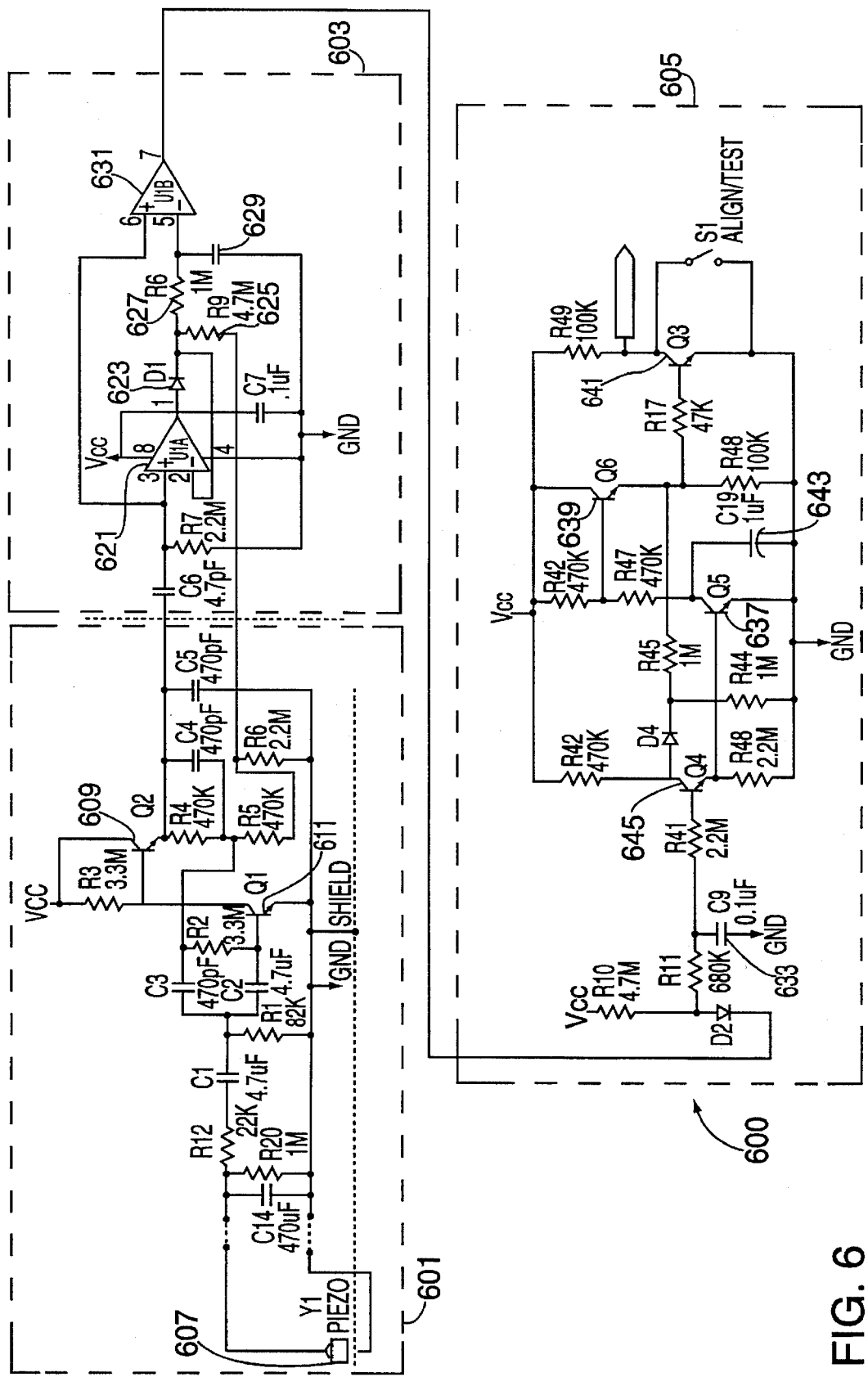
FIG. 6 is a schematic diagram of the electronic circuitry in accordance with a preferred embodiment of the invention.

In particular, the circuitry of FIG. 6 is designed such that piezoamplifier 601 consumes only two microamps at a voltage Vcc=6 volts. Piezoamplifier circuit 601 includes a mid-band gain of 25 dB and its −3 dB bandwidth extends from 170 Hz to 1.5 kHz. The range from 170 Hz to 1.5 KHz is the desired range of frequencies for vibration that indicates movement of the garage door. Thus, this is the only range desired. A sharp rolloff in the magnitude of 20 dB of rejection at 60 Hz is provided. Thus there is enhanced immunity to power line electrical noise. The circuitry also provides RF bypassing at the input and output to provide immunity to RF interference.

The piezoamplifier 601 including the active filter is insufficient to reject all the unwanted vibrations that occur. Thus, envelope detector with adaptive threshold 603 is provided. Envelope detector 603 is provided to distinguish between the continual vibrations associated with a closing garage door and the short, sporadic vibrations which result from miscellaneous contact with a stationary garage door, such as wind and contact from outside object. The envelope detector includes an adaptive threshold, so that a single peak amplitude, within the appropriate band range will not alter the output of the envelope detector.

Comparator 621, diode 623, resistor 625, resistor 627 and capacitor 629 form a low-level peak detector and delay filter. The voltage across capacitor 629 charges to approximately between 50% and 70% of the peak amplitude of the vibration signal within roughly 100 mS, but does not discharge until roughly 600 mS after the vibration signal has disappeared. Comparator 631 compares the original vibration signal against the voltage at capacitor 629. When the original vibration signal exceeds the voltage at capacitor 629, the output of comparator 631 is a square wave "carrier" with the same instantaneous frequency as the vibration signal. Alternatively, when the "envelope" of the vibration signal is less than the voltage at capacitor 629, the output at comparator 631 is high (an inactive state).

When a short duration vibration (less than 100 mS) is received, only a short duration carrier will appear at the output of comparator 631. The short duration carrier will be rejected by the integrating carrier detect circuit 605. However, the long duration carriers generated from a closing garage door will be accepted by the integrating carrier detector circuit 605.

The output of comparator 631 is input into integrating detector circuit 605. Capacitor 633 maintains a normally charged state. When a carrier pulse is present at the output of comparator 631 the voltage across capacitor 633 will discharge slightly. When the voltage across capacitor 633 discharges to less than 0.5 Vcc, the low current Schmitt trigger comparator formed by transistors 635, 637 and 639 is triggered. This occurs when the carrier pulses are present at the output of comparator 631 for more than 125 mS. The output of the Schmitt trigger drives open collector transistor 641. This causes "wake up" of the high-current device used for obstruction detection; for instance, the infrared transmitter and receiver assembly or RF transmitter discussed above. Capacitor 643 is provided to store a charge across transistor 637 which provides an extended turn-off delay for the Schmitt trigger, so that it will remain triggered for roughly 1,000 mS after the vibration signal from motion of the garage door has ended and, hence, the carrier pulse has disappeared.

The piezoamplifier circuit 601 generally detects vibrations and provides a bandpass function so that vibrations in a predetermined range will indicate motion of the garage door. This signal is then transmitted to the envelope detector and adaptive threshold circuit 603, so that it can be determined whether the vibrations detected by the piezoamplifier circuit 601 are extraneously noise, or are extended periods of the predetermined range at appropriate thresholds amplitudes. When an appropriate signal is determined by the envelope detector with adaptive threshold circuit 603—a square wave is input into integrating carrier detector 605 which wakes up the obstruction detector and allows the high current obstruction detector to function.

It is also noted that the Vcc in the preferred embodiment is 6.0 volts. 6 volts can easily be provided by providing four 1.5 volt alkaline batteries in series. The main objective of the wake up circuitry of FIG. 6 is to minimize the consumption of current during the standby state in order to increase battery life.

The wake up circuitry is functional with either a contact type obstruction detector or a non-contact obstruction detector.

As discussed above in the Background of the invention, door mounted obstruction detectors are known in the art. The disclosure of U.S. Pat. No. 5,191,268 (the '268 patent) issued on Mar. 2, 1993 is incorporated herein by reference. The obstruction detector of the '268 patent discloses a compressible obstruction detector that is mounted on the leading edge of a garage door. The obstruction detector is formed of a compressible tube with multiple contacts inside. The contacts are either in the normally open or normally closed position, and when the tube is compressed the contacts then go into the opposite condition from the normal. Accordingly, if the contacts are normally closed and a signal can pass therethrough, upon contact of the tube the contacts then go to an open position where no signal can pass therethrough. The '268 patent does not mention that it is difficult to run appropriate wires from the compressible obstruction detector to the control circuitry as is required in the '268 patent.

Figure 7:
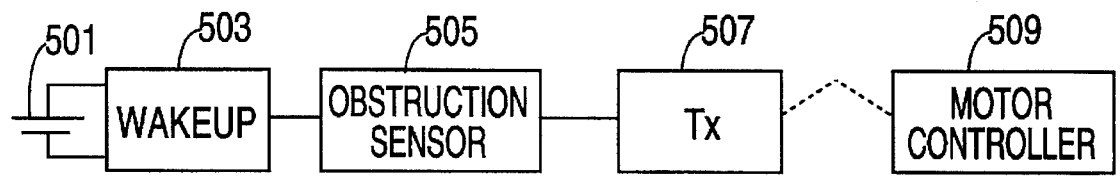
FIG. 7 is a block diagram of the system componentry of an alternative embodiment of the invention.

Particular reference is now directed to FIG. 7, wherein a new circuit is provided for integrating a compressible obstruction detector as disclosed in the '268 patent with the present wireless system. Battery 501 provides energy to the circuit. A wake up circuit, such as disclosed in FIG. 2, including an audio frequency receiver 221, filter 223 and one shot 225 may be used. However, as discussed hereinabove with regard to the door mount system, it is more preferable, and economical to incorporate a motion sensor into a door mount system in order to provide the wake up. Accordingly, wake up assembly 503 is connected to battery 501. Wake up assembly is also connected to obstruction sensor 505 in order to provide a dormant state and an active state. The obstruction sensor includes a radio frequency transmitter 507, or the like in order to wirelessly transmit a signal to motor controller 509. An exemplary motor controller is disclosed as controller 202 of FIG. 2.

Accordingly, it can be seen that a large advantage is provided by having such a wireless safety system for a garage door opener because the end user, or person installing such a system would not be required to connect complex wires between the controller unit at one end and the obstruction detector (infrared transmitter and receiver) at the other end. Furthermore, each unit can be self contained and does not require plugs or connectors or wires that can often crimp, corrode or deteriorate.

As stated hereinabove, the approval signal provided by the obstruction detector (infrared receiver assembly 215) to the radio frequency receiver 207 of controller unit 202 can be the same receiver that produces the start command 201. In other words, radio frequency receiver 207 can also receive a start pulse from the remote located in a user's automobile. This may be accomplished by the radio frequency receiver 207 receiving the start pulse and providing the approval signal to logic 203 which starts the operation of the system as described hereinabove.

Another optional enhancement of the present invention is to provide the system with a piezoelectric sensor to power the audio frequency receiver and filter stages of the infrared transmitter assembly 213 and infrared receiver assembly 215. In other words, the energy from the audio noise would be converted to useable electric energy. In so doing, the systems can then be designed using a sealed assembly having lithium batteries therein. This system may provide approximately a five year useful life (based on normal average use) and the lithium batteries will only power the infrared transmitter 227 to produce infrared beam 240 and the radio frequency transmitter 239, to produce the approval signal.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language might be said to fall therebetween.

What is claimed is:

1. An automatic door opening safety system having a door including a leading edge that moves along a path between an open position and a closed position, comprising:
   means for controlling movement of said door;
   activation means for providing an input to said controlling means to initiate said movement of said door;
   detecting means for detecting whether an obstruction is in the path of said door; and
   said detecting means being positioned in front of the leading edge of said door, such that obstructions are detected at a distance in front of the leading edge of said door;
   wherein said detecting means includes an infrared transmitter and an infrared receiver arranged to detect said obstruction therebetween; first and second ball jointed attached to first and second mounting plates which secures said infrared transmitter and said infrared receiver respectively to said door.

2. The safety system of claim 1, wherein said first and second mounting plates is deflected when said door closes, so that said detecting means maintain alignment without being damaged.

3. The safety system of claim 1, wherein said detecting means is moveable between a first position in front of said leading edge of said door and a second position recessed behind the leading edge of said door.

4. The safety system of claim 1, wherein said detection means is a selectively switchable between a first state wherein said means does not detect obstructions and operates at a low power level, and a second state wherein said detection means detects obstructions and works at a higher power level.

5. The safety system of claim 1, wherein said detection means is selectively switchable between said first state and said second state by motion of said door.

6. The safety system of claim 5, further including an electronic circuit for detecting motion of said door.

7. The safety system of claim 6, wherein said electronic circuit includes a piezoelectric transducer for sensing motion of said door and outputting a signal.

8. The safety system of claim 7, including an active filter for receiving said signal from said transducer and outputting a filtered signal.

9. The safety system of claim 8, including detection means for receiving said filtered signal and determining whether the filtered signal represents motion of a door, and outputting a driving signal when said filtered signal represents motion of said door.

10. The safety system of claim 9, wherein said detection means includes a comparator.

11. The safety system of claim 9, further including a carrier detector circuit coupled to said detection means for driving a high current device when said driving signal is received from said detection means.

12. The safety system of claim 11, wherein said carrier detector circuit includes a trigger circuit.

13. The safety system of claim 12, wherein said trigger circuit is a Schmitt trigger comparator.

14. The safety system of claim 13, wherein said Schmitt trigger comparator includes three transistors.

15. The safety system of claim 14, wherein said filter is a bandpass filter that extends substantially from 170 Hz to 1.5 KHz.

16. An automatic door opening safety system having a door moving along a path between an open and a closed position and including a leading edge, said system comprising:

control means for controlling movement of said door;

detection means for detecting an obstruction in the path of said door, said detection means including an obstruction sensing device;

a support plate supporting said obstruction sensing means; and coupling means for coupling said mounting plate to in a first and a second position, wherein in said first position said construction device is disposed in front of said leading edge and in said second position, said obstruction sensing device is pivoted away from said leading edge to avoid interference with said leading edge when said door is closed.

17. The apparatus of claim 16 wherein said coupling means includes a base plate fixed to said door, and a pair of parallel arms extending from said base plate to said support plate.

18. The apparatus of claim 17 wherein said base plate, said support plate and said arms cooperate to define a parallelogram.

19. The apparatus of claim 17 wherein coupling means further include living hinges, said arms being connected to said plates by living hinges.

20. The apparatus of claim 19 wherein said plates and arms are integrally formed.

* * * * *